(12) United States Patent
Longman et al.

(10) Patent No.: US 6,587,551 B2
(45) Date of Patent: Jul. 1, 2003

(54) MONITORING SYSTEM (75) Inventors: Peter George Longman, Sutton Coldfield (GB); Christian Moray Jackson, Sutton Coldfield (GB)

(73) Assignee: Care Monitoring 2000 (GB)

( * ) Notice: Subject to any disclaimer, the term of this patent is extended or adjusted under 35 U.S.C. 154(b) by 152 days.

(21) Appl. No.: 09/835,372

(22) Filed: Apr. 17, 2001

(65) Prior Publication Data

US 2002/0064260 A1 May 30, 2002

(30) Foreign Application Priority Data

Nov. 30, 2000 (GB) ............................................. 0029259

(51) Int. Cl.$^7$ ............................................. H04M 11/00

(52) U.S. Cl. ...................... 379/106.02; 379/913; 705/32

(58) Field of Search ....................... 379/106.02, 106.01, 379/133, 38, 142.05, 142.15, 142.1, 140, 913, 93.01; 705/7, 30, 32

(56) References Cited

U.S. PATENT DOCUMENTS 5,963,912 A * 10/1999 Katz ........................... 379/913

FOREIGN PATENT DOCUMENTS

| GB | 2 298 994 | 9/1996 |
| GB | 2 349 540 | 11/2000 |
| WO | WO 96/27973 | 9/1996 |

* cited by examiner

Primary Examiner—Wing Chan
(74) Attorney, Agent, or Firm—Finnegan, Henderson, Farabow, Garrett & Dunner LLP (57) ABSTRACT

The invention concerns a monitoring system for monitoring incoming telephone calls routed through a call transference system, the system comprising an electronic processor and an associated database, the system being adapted to detect the originating number of the caller and the called number to which the incoming call was made before being transferred, to automatically generate a return call to any incoming call the originating and called numbers of which have been identified without answering the incoming call, and to store the time and date of an incoming call the number of which has been identified and data representing the number to which the incoming call was made.

12 Claims, 11 Drawing Sheets

MONITORING SYSTEM

BACKGROUND OF THE INVENTION

1. Field of the Invention

The present invention concerns monitoring systems for monitoring whether or not a person has reached or left one or more selected destinations.

2. Disruption of the Prior Art

Such systems are already known and are particularly useful in the expanding field of home caring. In the last few years there has been a substantial increase in the number of elderly or incapacitated people who live in their own homes and are reliant on regular visits by carers. The carers can belong to either local authorities or private organisations. In either case it is necessary for management to be able to monitor the staff who carry out the actual visits in order to ensure that the visits are both actually made and also importantly, made at the right time.

Before the arrival of Computer Integrated Telephony (CTI) such monitoring would normally be carried out on the basis of time logs filled in by individual staff. More recently systems have involved a user calling into a central office and inputting an identifying PIN number. A similar call on departure will identify the period at which the caller was at a particular address as Caller Line Identification (CLI) will supply the time, date and location of the calls.

A disadvantage of such a system is that calls actually have to be completed by being answered at the central office. This causes additional expense and also takes time.

A concern of the present invention is to provide a simple yet efficient monitoring system.

Thus an embodiment of the invention provides a monitoring system in which incoming calls remain uncompleted, i.e. no expenses incurred, and in which a call is returned automatically to the original caller.

However there still remains the problem in that many organisations employing carers require, for payroll and client billing purposes, confirmation with regard to each visit of the actual identity of the carer rather than just confirmation that a visit has been made at a particular client location. With the earlier situation in which the incoming calls are answered and the carer enters an identifying PIN the carer is identified immediately. In the unanswered system of the first embodiment of the invention the carer's identity is only confirmed by referring to a prior schedule which matches the location from which the incoming call was made with the carer who in accordance with the schedule was meant to make the visit. However this means that the schedule has to be up-dated constantly so that problems can arise if the schedule is out of date. This is difficult to achieve. There is therefore the risk of inaccuracies occurring in the electronic timesheets that are produced as a result of the matching process. Such discrepancies could have serious consequences if the system was to be used as a basis for determining staff pay.

SUMMARY OF THE INVENTION

The present invention is also concerned with providing a solution to this problem whilst still giving the cost saving advantages of an unanswered calling system. One aspect of the invention comprises—(claim 1)

The present invention can be implemented by a computer program operating on a standard desk top computer. An aspect of the present invention thus provides a storage medium storing processor implementable instructions for controlling a processor to carry out the method as hereinabove described.

BRIEF DESCRIPTION OF THE DRAWINGS

In order that the present invention may be more readily understood, an embodiment thereof will now be described by way of example and with reference to the accompanying drawings, in which.

MORE DETAILED DESCRIPTION

Whilst the following description is given in relation to a home caring situation it will be appreciated that there are many other situations where it is wished to monitor the visits of people to outside locations other than the home caring situation.

Figure 1:
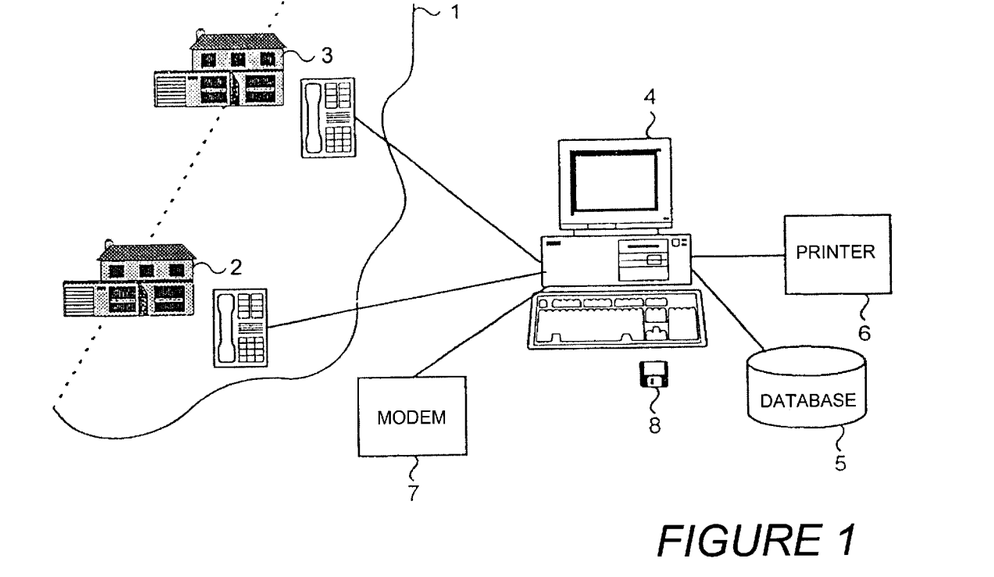
FIG. 1 shows a general overview of a monitoring system incorporating the present invention.

Referring now to FIG. 1 of the accompanying drawings the Public Services Telephone Network (PSTN) is shown at 1. Two locations 2 and 3 each with a telephone represent sites to be visited by a user of a monitoring system. As shown in FIG. 1 the monitoring system comprises a programmable electronic processor 4, a database 5, a printer 6 and modem 7 whereby data can be sent to clients via the internet. The database for example can comprise an external hard disc or internal memory space of the processor 4.

It will be appreciated that the monitoring system to be described can be used in a number of different ways. Firstly an organisation employing people who travel from place to place, such as home carers, can operate the system themselves. The monitoring system can also be used by one organisation to monitor activities on behalf of one or more other organisations.

Figure 2:
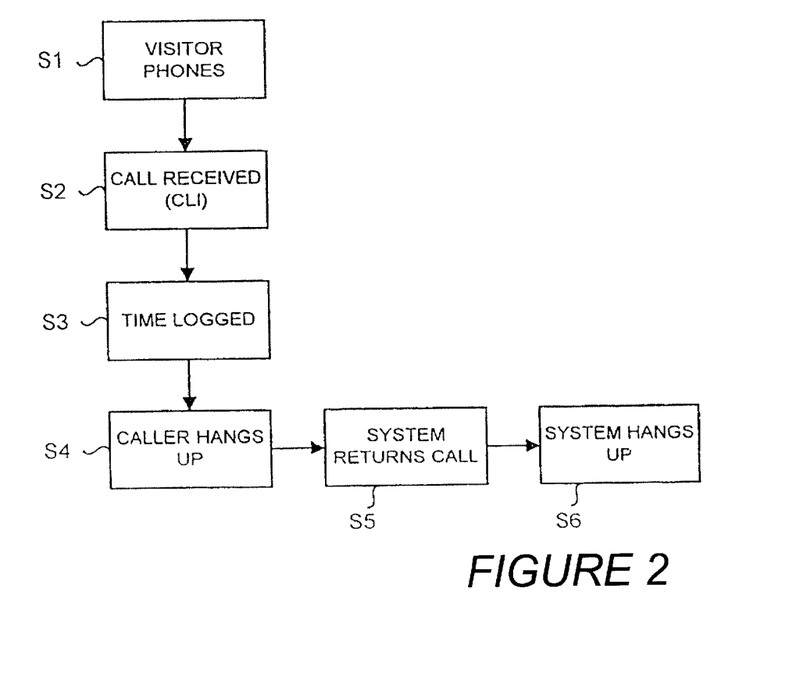
FIG. 2 is a flow diagram of the basic operation of the monitoring system of FIG. 1.

Referring now to the flow diagram of FIG. 2, step S1 represents the point at which a visitor such as a carer rings into the monitoring system for example from location 2. At step S2 the call is received at the monitoring system 4. It is assumed that CLI is available on the incoming call. Using CLI the call is time logged and the source number identified at step S3. However the call is not answered and the circuit between the caller and the monitoring system 4 is not completed. This is achieved by the caller hanging up at step S4 within a short specified period, for example after three or four rings. At step S5 the monitoring system automatically returns the call to the originating number. Once again this call is not answered and the monitoring system is programmed to hang up at step S6 after a short predetermined period, for example two rings. This sequence is carried out at the start of a visit. When the caller has completed his/her business at location 2, a call is once again made to the monitoring system which follows the same procedure. Thus a clear record is made of both the start and end times of the visit. The caller the proceeds to the next location, location 3, and the procedure repeated.

Figure 3:
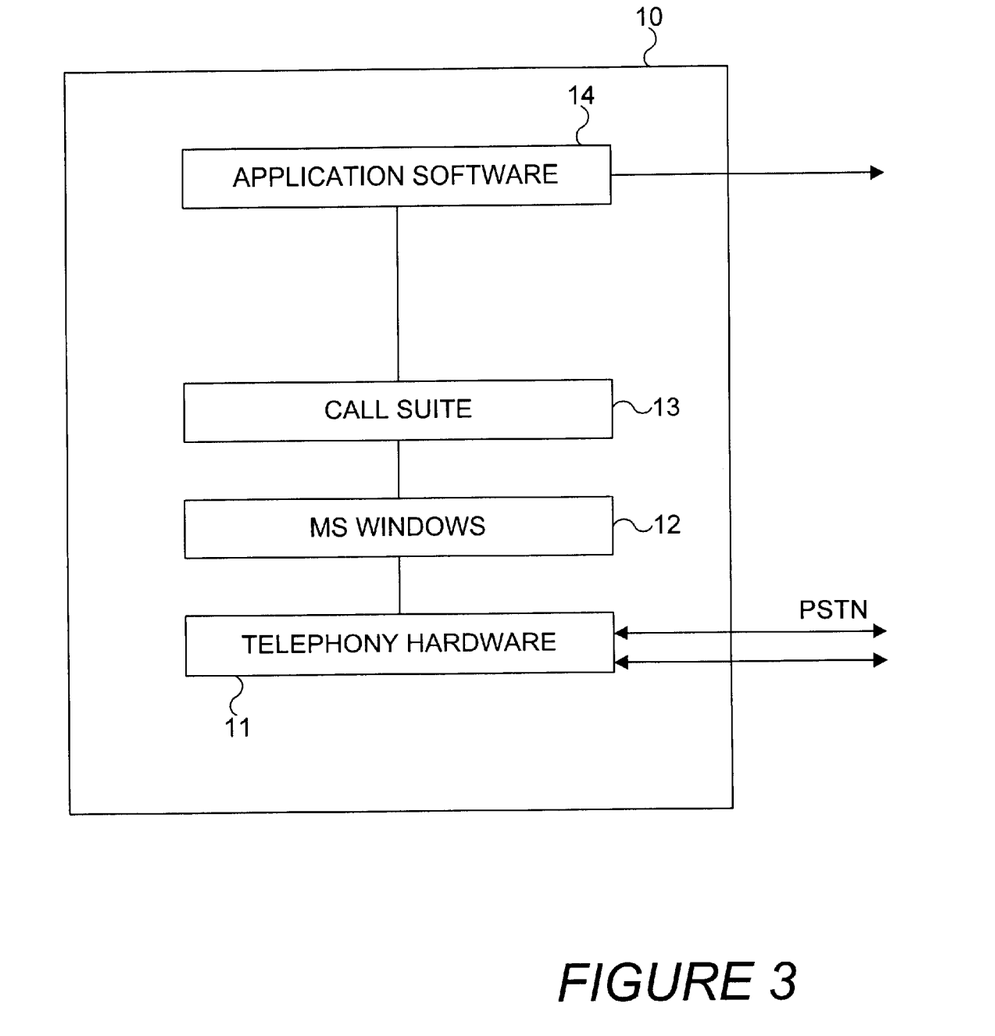
FIG. 3 is a block diagram of the hardware involved in the monitoring system of FIG. 1.

Referring now to FIG. 3 of the accompanying drawings, this shows in block form the functional organisation of the monitoring system of FIG. 1.

In the present embodiment the main hardware is a personal computer generally indicated at 10 which can be an IBM (RTM) or IBM compatible computer operating in a Microsoft Windows (RTM) environment though of course both the type of computer is not essential and the operating system need not necessarily be Windows based. Alternative systems include DOS and UNIX.

The computer 10 is provided with a plug-in card 11 enabling the computer to receive calls from the PSTN. A typical card is a Dialogic pro-card, part number D/21H-UK manufactured by the Dialogic Corporation of the USA. This plug-in card 11 interacts via Microsoft Windows (indicated at 12) with another software suite 13 such as the Parity Callsuite manufactured by the Parity Software Corporation of the USA. The Parity Callsuite provides a comprehensive set of VBX and OCX controls and can also be used in a number of different operating environments such as Visual Basic, Visual C++, Delphi and Visual Fox Pro.

Figure 4:
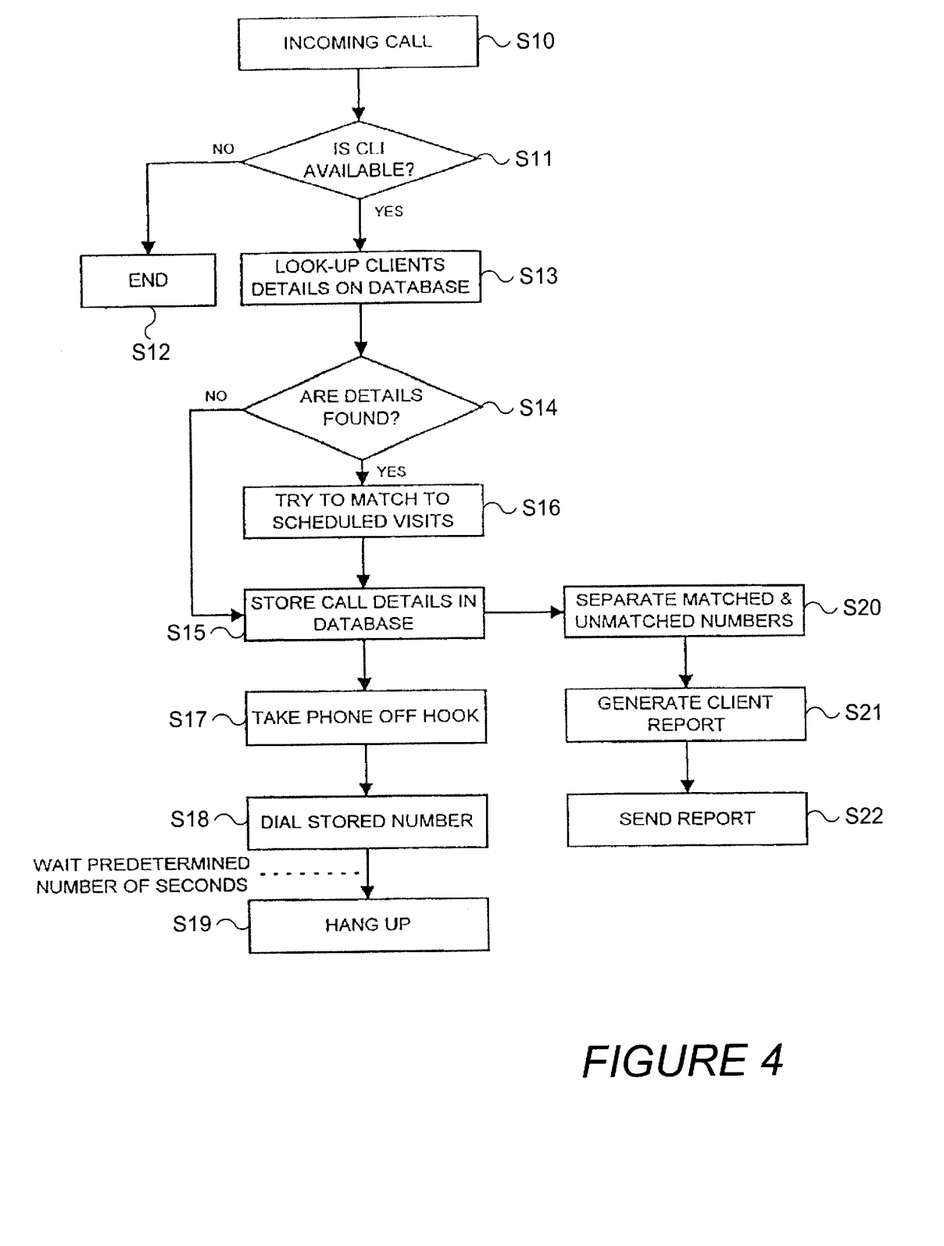
FIG. 4 is a flow diagram of the operation of application software for the hardware of FIG. 3.

The software suite 13 in turn interacts with application software 14 in accordance with the flow diagram shown in FIG. 4 of the accompanying drawings.

Thus the application software 14 receives notification of an incoming call from the suite 13 at step S10. At step S11 the application software checks if CLI is available. If not the flow ends at step S12. If the answer is YES the flow proceeds to step S13 where the application software looks for the clients' details in the database 5. At step S14 a decision is made with regard to the existence of the clients details. Even if the incoming number is not matched with a client number the details of the incoming call are stored at step S15 in the database 5 as there is a possibility that the monitoring system will not have been informed of a new client number.

If the number of the incoming call is matched in step S13 with a client then in step S16 an attempt is made to match the time of the call with a schedule of times stored in database 5 and once again details of the call are stored in step S15 in the database.

At step S17 the application software 14 takes the phone off-hook and at step S18 dials the stored telephone number, waits a predetermined number of seconds while the dialled number rings and at step S19 hangs up without a call having ever been completed.

In many cases the monitoring system will be acting for a plurality of clients each of whom will have a number of people making regular visits and who will require to have regular reports on the dates, times and extent of the visits.

Thus at step S20 the application software separates matched and unmatched incoming numbers, collates the matched number in accordance with the client to which they belong, generates data at step S21 showing whether or not a matched call corresponds to a scheduled visit and generates one or more reports at step S22. These can be displayed, printed by the printer 6 for onward transmittal or sent to the clients via the internet connection 7 or (permanently connected) to a leased line.

Whilst the forgoing description has been given with regard to the PSTN it will be appreciated that what has been described is equally applicable to a local network, or that the monitoring system is itself located in LAN or a WAN connected to the PSTN.

From the foregoing description it will be appreciated that the monitoring system described has a number of advantages over the prior art. All unanswered call systems work on the basic principle that CLI and date/time information is transmitted along phone lines before a connection is made i.e. without incurring call charges. The present embodiment differs in that when a user replaces the handset after allowing the phone to ring a prescribed number of times, instead of hearing nothing, after a short pause the system automatically dials and returns a number of rings to the incoming caller, and then hangs up. The whole process can take less than 20 seconds. In a modification of the embodiment just described the system can hang up after a predetermined number of rings if the caller continues to ring over the normal number, This prevents the system from getting clogged.

The main problem with existing CLI only monitoring systems is that the person making the call has no way of knowing if their call has been logged or not. For example, they may have dialled the wrong telephone number of they may not have let the phone ring a sufficient number of times for the system to pick up the CLI as 4 rings is usually the minimum.

It would be very difficult to prove or disprove whether the caller has or has not phoned in—or more to the point whether they made the visit or not—as the caller could argue that the system did not pick up the call. With the system as described, not only will the caller have received verification that the call was received and CLI recorded by means of the automatic ring-back facility, but also the system can tell the controller that the caller received confirmation by showing whether the ring back was successful or not.

One of the difficulties of conventional CLI only systems is that there is a small chance that CLI will not be picked up even from a telephone which normally sends a CLI signal. The intermittent disruption to the CLI transmission is unpredictable and means that there will always be a % of calls which will show as exception errors and can never be matched to a client. This makes such systems inherently fallible if accurate timesheet replication is required. The advantage of approach described in the present specification is that if an intermittent CLI problem occurs and the caller does not hear a ring-back on the first time they ring, all they have to do is ring the number once again and it is almost certain that they will get a ring-back on their second attempt.

The system could potentially be used to notify the caller of whether they are making an arrival or departure call by varying the number of rings that the caller hears on ring-back (e.g. 1 ring for arrival, 2 rings for departure). This would work by programming the system to recognise where the caller is calling in for the first time from a particular number and then recognising where the caller is calling for the second time from that same number—during the same visit. This could be done by matching calls to Care Plans or by ensuring that the caller makes all calls exactly in sequence i.e. 1 call in and 1 call out for every visit. It would assume that the correct number of calls were made for each visit.

Figure 5:
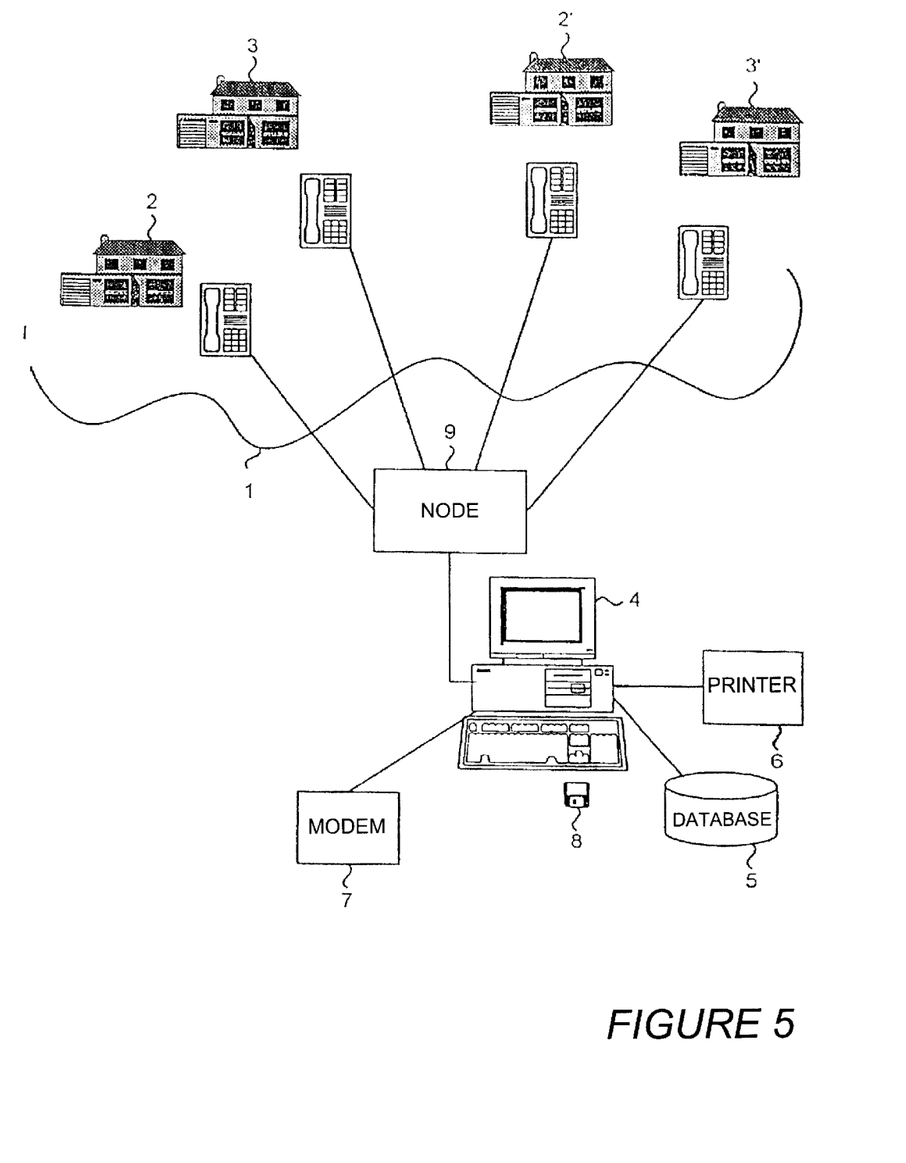
FIG. 5 shows a general overview of a second embodiment of the monitoring system incorporating the present invention.

Referring now to FIG. 5 of the accompanying drawings the Public Services Telephone Network (PSTN) is shown at 1 this shows a second embodiment of the present invention. Two locations 2 and 3 each with a telephone represent client sites scheduled to be visited by a specific user of a monitoring system. Two further locations 2' and 3' are scheduled to be visited by another user of the monitoring system. In a system in which incoming calls were answered each user would have their own PIN number. As shown in FIG. 5 the monitoring system comprises a programmable electronic processor 4, a database 5, a printer 6 and modem 7 whereby data can be sent to clients via the internet or dial-up modem connection. The database for example can comprise an external hard disc or internal memory space of the processor 4.

It will be appreciated that the monitoring system to be described can be used in a number of different ways. Firstly an organisation employing people, such as home carers, who travel from place to place, can operate the system themselves. The monitoring system can also be used by one organisation to monitor activities on behalf of one or more other organisations. Also shown in FIG. 5 is a node 9 of the PSTN to which the calls from the locations 2, 2', 3 and 3' are directed before being to the monitoring system. The overall telephony system shown in FIG. 5 is an ISDN-system (Integrated Services Digital Network) or a comparable system. A feature of ISDN systems is that a user is able to purchase a number, usually a 0800-number which is free to the caller. Such numbers will be referred to hereinafter as "free call numbers". Thus a caller dials the free call number and is then transferred to the call's final destination which bears the cost of the call rather than the caller. In addition ISDN supports what is known as DNIS (Dialled Number Identification Service). By means of the latter feature the recipient of an free call can not only, using CLI (Caller Line Identification), identify the telephone and thus the location from which the call was made but also identify the 0800 number to which the call was made.

The present embodiment proposes that by utilising this DNIS feature together with the CLI information the caller can be identified unambiguously without the need to answer a call. Thus each caller is given his or her own individual free call number for a particular area. This can be done because it is a relatively simple and inexpensive matter for an organisation to acquire a sequential batch of 0800 numbers so that each number can be allocated to a specific user.

Figure 6:
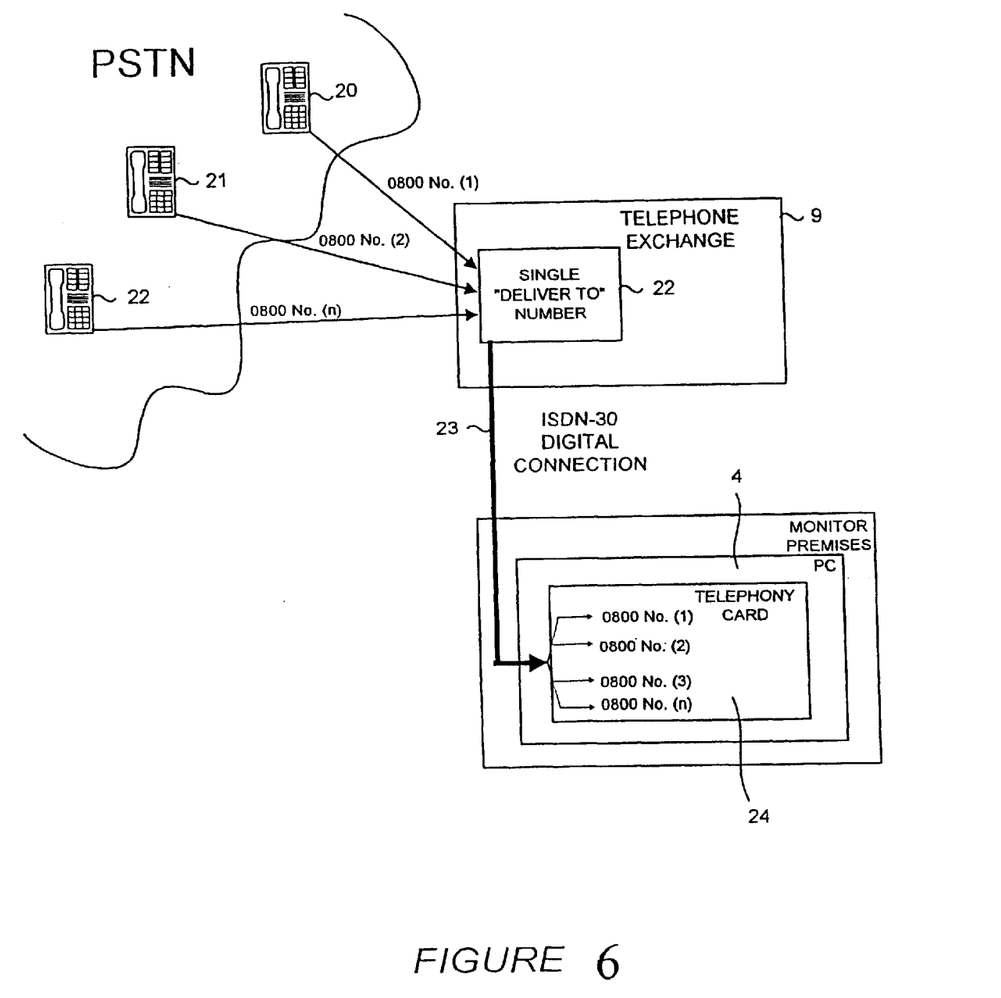
FIG. 6 is a block diagram showing some of the hardware of FIG. 5 in greater detail.

This arrangement is shown in greater detail in FIG. 6. Similar integers in this figure have been given the same reference numerals. However the diagrammatic telephones 20, 21 and 22 each represent a different user with a different free call number which in the present embodiment is a 0800 number. Three are shown, but the number associated with telephone 22 is indicated as 0800 . . . n to clearly indicate that this number is not limiting. Naturally each carer will travel within his or her allocated region to a number of clients. As shown all the telephones connect to the exchange 9 in such a manner that the exchange transfers the calls to a single number at the premises of the company carrying out the monitoring.

This is done by the function indicated at box 22 and is transferred to the premises via an ISDN-30 connection 23. At the premises an appropriate telephony card 24 in the computer 4 obtains the original 0800 numbers called using DNIS.

If the organisation acquiring and using the 0800 numbers is a large one it is still not necessary to have an individual number for every user. This is because the DNIS information is coupled with CLI which gives the location of the originally dialled call. Thus the coupling of the two pieces of information will identify the caller provided that users with the same 0800 number are distributed so that no number is ever used more than once in a particular telephone region.

It must also be appreciated that the system just described can operate without the use of 0800 . . . numbers or any other kind of "free call" number. Any number can be used provided that the caller has a unique number. The 0800 number merely ensures that a client does not have to pay for the call.

The hardware and functional organisation of the monitoring system of FIG. 5 in the same as that of the first embodiment and is shown in FIG. 3 and will not be described again.

Figure 7:
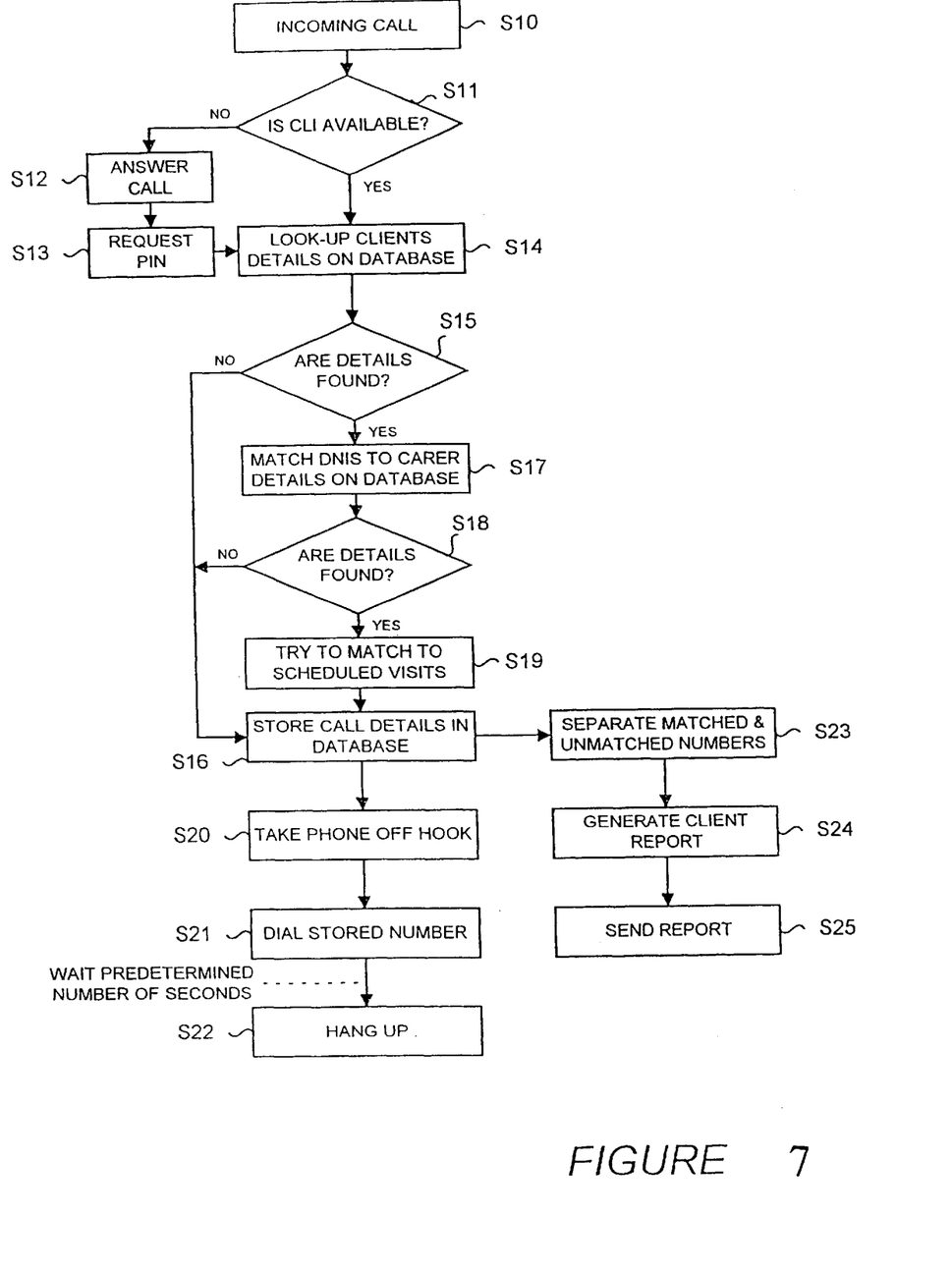
FIG. 7 is a flow diagram of the basic operation of the monitoring system of FIG. 6.

Turning now to the flowchart of FIG. 7 the application software 14 receives notification of an incoming call from suite 13 at step S10. For the purposes of this flowchart it is assumed that DNIS is available. At step S11 the application software checks if CLI is available. If not the call is answered at step S12 and the carer's PIN is requested at step S13. In either case data representing the carer's identity is entered to step S14. In this step the client's details as identified either by CLI or the input PIN are compared with client's details on the database 5. At step S15 a decision is made as to whether or not a match has been found in the database 5. If the incoming number is not matched with a client location the details of the incoming call are stored at step S16 in the database 5 as there is a possibility that the monitoring system will not have been informed of a new client number.

If the number of the incoming call is matched in step S14 then in step S17 the DNIS is used to look-up the carer details in the database 5. If at step S17 a match cannot be found this information is stored in the database 5 in step S16. Otherwise after step S18 an attempt is made to match at step S19 the time of the call with a schedule of times stored in database 5. Additionally the final details of the call are stored in the database. The final details will include the client location and the carer's identity if these were available.

At step S20 the application software 14 takes the phone off-hook and at step S21 dials the stored telephone number, waits a predetermined number of seconds when the dialled number rings and at step S22 hangs up without a call having ever been completed.

In many cases the monitoring system will be acting for a plurality of clients each of whom will have a number of people making regular visits and who will require to have regular reports on the dates, times and extent of the visits.

Thus at step S23 the application software separates matched and unmatched incoming numbers, collates at step S24 the matched number in accordance with the client to which they belong, generates data showing whether or not a matched call corresponds to a scheduled visit and generates one or more reports. These can be displayed, printed by the printer 6 for onward transmittal or sent at step S25 to the clients via the internet connection 7 or other suitable electronic media, eg leased line dialup modem.

It will be appreciated that steps S20, S23–S25 are optional and that the acquired data can be processed in other ways provided that information corresponding to CLI and DNIS is available or equivalent.

Advantageous additional features of the second embodiment will now be discussed. Thus it is possible to identify whether a call represents an arrival or a departure. Using digital or analogue telephone connections, it can be identified when a caller hangs up—without the call being answered. By automatically recording a. when the call is first presented to the system, (that is the ring tones commence) and b. when the caller hangs up (the ring tones cease) it can be measured how long the calling party allowed their phone to ring the system number. Another advantage is that by knowing exactly when the calling party hangs up the system can immediately send the return call without any delay. This is an improvement on the existing system whereby the system sends a return call after a predetermined time period i.e. when it thinks the call er has hung-up.

By instructing users of the system to vary the length of time they allow the phone to ring for when calling the system, the different types of visit events can thus be readily identified. One useful application of this process is to record whether the caller is arriving at a Clients home at the start of a visit or leaving a Clients house at the end of a visit. So, for example, the caller could allow the phone to ring 3 times on arrival and 5 times on departure. In order to confirm to the caller that the system has correctly identified the visit type, the application software can be programmed to vary the number of times it makes the Clients telephone ring during the ringback process. This could be the same number of times the caller rang or a different number e.g. 2 for arrival and 3 for departure. Again, in all cases, there is no requirement for either the initial call or confirmation call to be answered in order for visit details to be recorded. Calls can be connected, however, if desired as in the case described below.

One of the fundamental features of the system described in this specification is the ability to automatically make a return call to the calling party within 10 seconds of the original call. An improvement to this process is when the return call can be automatically programmed to ring until answered (or for a specified time period) under certain conditions. One of the principal features of the system in its current application as a homecare monitoring device is in its ability to facilitate communication between managers/ supervisors and field workers. Traditionally, if a manager/ supervisor wishes to make contact with a certain member of staff they would probably look at a schedule of work to identify where the field worker in question was expected to be. Because of the nature of the job, it is extremely unusual for homecare staff to adhere rigidly to a fixed time schedule of work and hence the manager/supervisor may have to make many calls to different Clients before tracking down the field worker and communicating with them. Many Care workers do now carry mobile phones but it is costly to make calls from fixed line to mobile phone services.

As already described existing systems rely on calls being answered and a PIN number recorded to identify the intended recipient. The solution proposed in the present case provides Carer identification through DNIS and hence the system will recognise if a Carer has a message waiting for them without the call being answered. In this solution, there are two alternatives according to customer preference for how the message can be retrieved. Firstly, the system can automatically play the message to the recipient when the caller rings the system and within the 3 to 5 rings that the caller would normally make before hanging up using the unanswered system. The message would be downloaded and an option given at the end of the message for the recipient to record a return message to the originator if they so desire. Secondly, the system can be programmed to—initially— treat the call as a normal call and wait for the caller to hang up after 3 to 5 rings. However, when the system calls back it can make the Clients phone continue to ring until the call is answered (or certainly for a much longer time period than the usual 2 to 3 rings). When the call is answered, the message is delivered as before and again with the option for the recipient to leave a return message if so desired.

The advantage of the second option for message delivery is in the fact that the caller will be more likely to respond to the phone ringing out continually as it is an obvious means of communication. The risk with the first option is that the caller will be so used to their initial call not being answered (as it is anticipated that only a small percentage of callers would have a message waiting for them) that they may not even hold the phone to their ear when calling the system. Another advantage to the second option is that because the message is delivered during the ringback process it is always the Call Centre which will incur the direct call charges for the delivery of the message. This is an important issue as many homecare users, Clients, are older and often confused—they have genuine concerns that they may be paying for the cost of calls on their telephone bill. In reality this cannot happen as 0800 numbers are utilised for this service—whether calls are answered or unanswered, this system does give added reassurance to Clients.

Figure 8A:
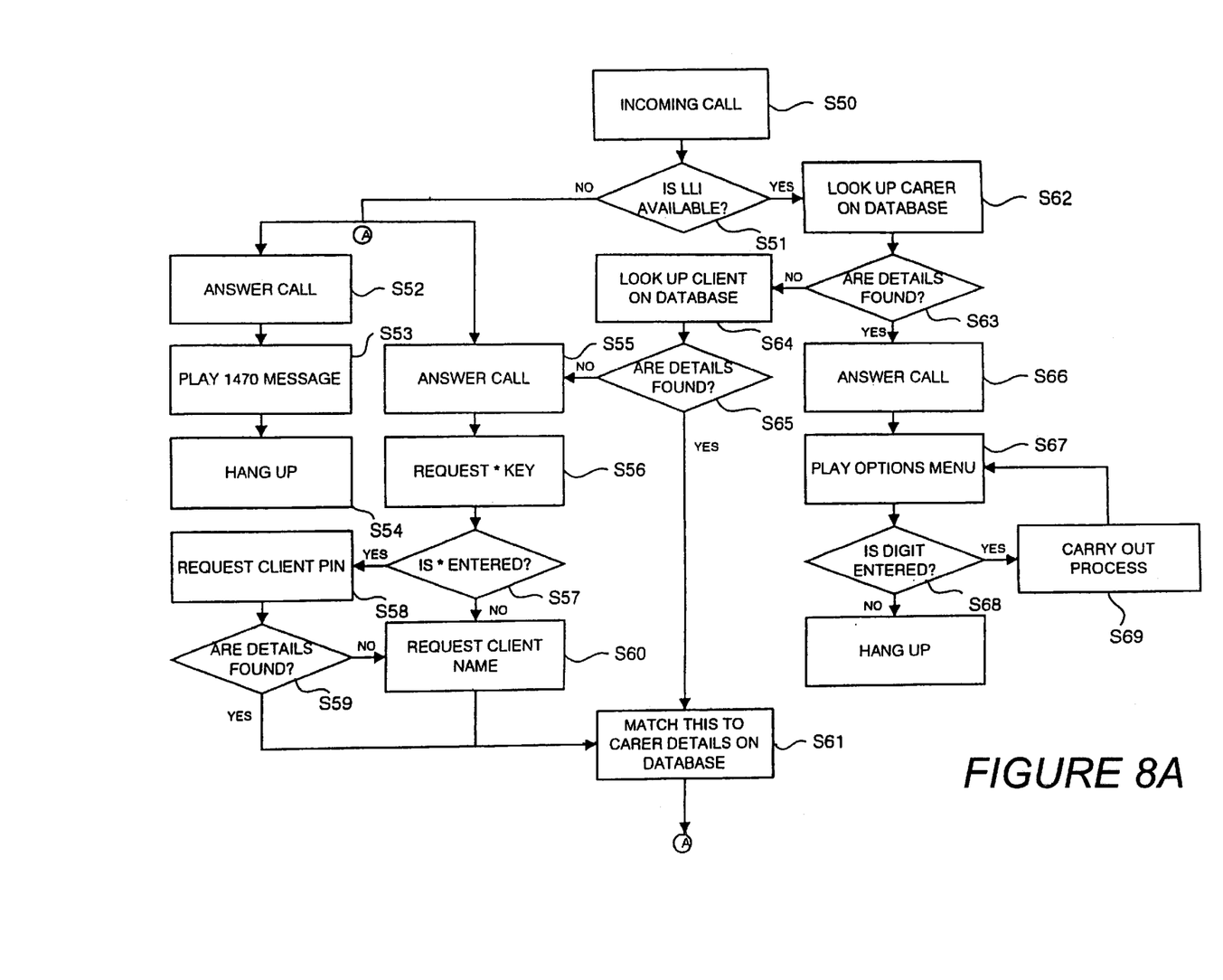
FIGS. 8A–8C collectively show a flow diagram of the operation of application software for the hardware of FIG. 4 but modified in accordance with the second embodiment.
Figure 8B:
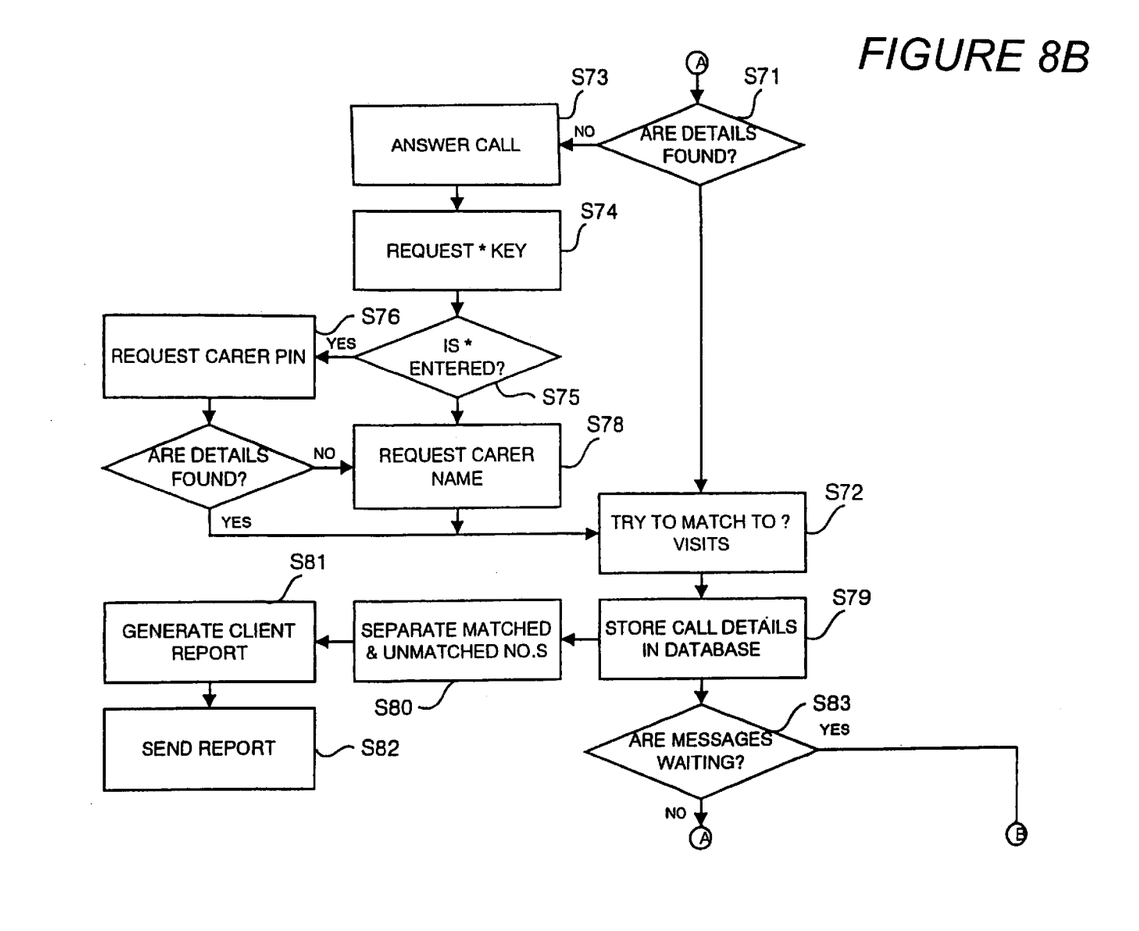
Figure 8C:
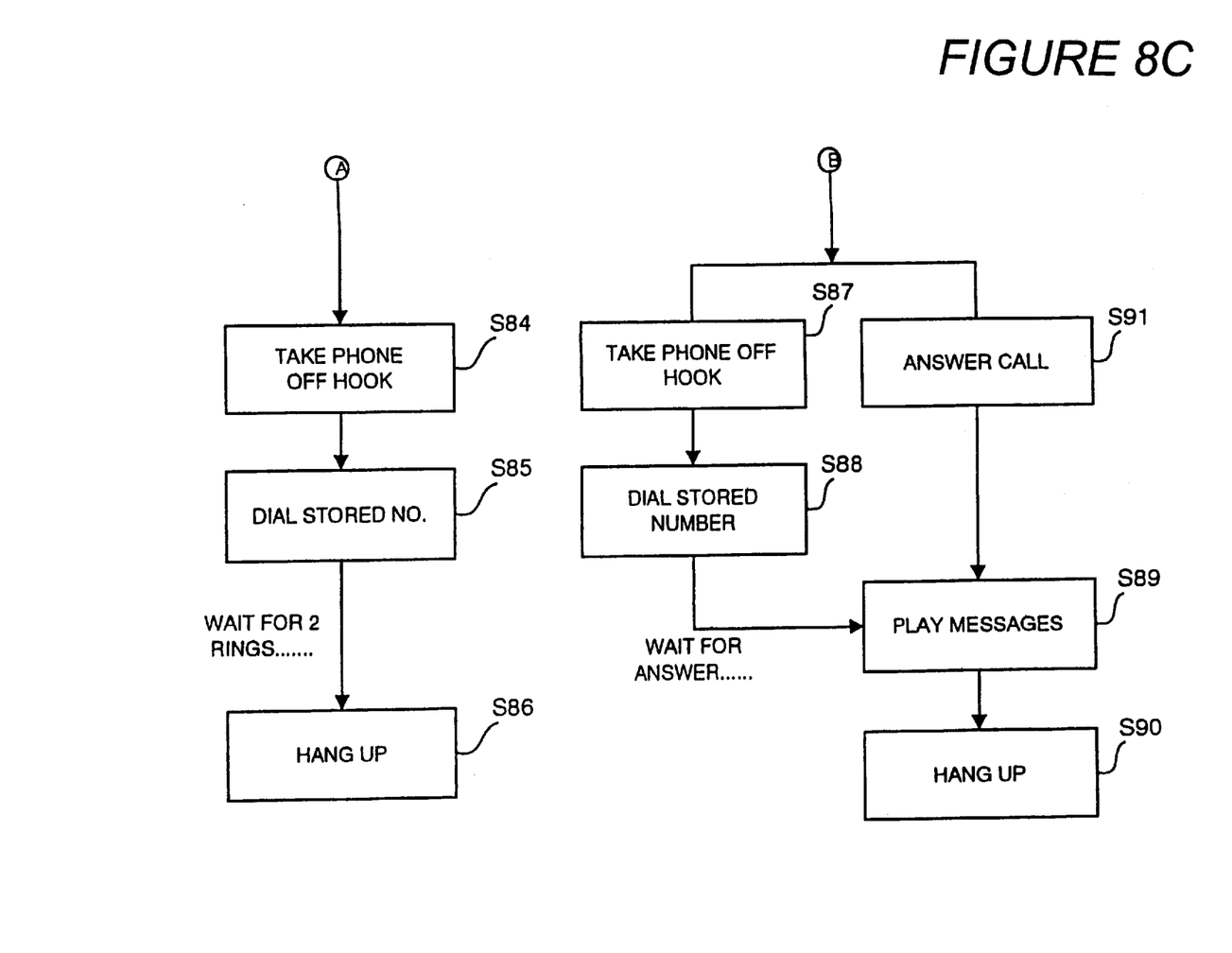

Turning now to FIGS. 8A–8C of the accompanying drawings, these figures collectively show a flow diagram of the operations which can be carried out by the enhanced system just described.

As in the previously described f low diagrams the first two steps S50 and S51 represent receipt of an incoming call by the software suite and determining if CLI is available or not.

However if CLI is not available the data flow does not end. Instead the system offers alternative options which are shown in the Figure as parallel branches. In the first option the call is answered at step S52 within the number of rings that the caller would normally be waiting for such as 3 rings. The carer is asked, preferably by a recorded message to redial prefixing the number in the UK system with the number 1470. This temporarily switches off the CLI barring for this call only. The caller then responds at step S53 with the 1470 message and hangs up at step S54.

In the other option the call is again answered by the system, this time at step S55. Once again the call is answered before the caller receives the expected number of rings. At step S56 the initial caller is asked to press the star key in order to allow the system to determine whether or not the phone is a push button one. Step S57 decides whether or not the star key has been pressed. If the answer is YES the client's PIN is requested at step S58 and at step S59 it is checked whether or not the requested PIN is on the database. If the answer to this step is NO the client's name is requested at step S60 and the answer from either step S59 or step S60 entered in the database at step S61 in order to attempt to match the client's details with the schedules and locations stored on the database.

If the outcome of decision step S51 is "YES" step S62 looks up the carer details on the database and at step S63 a decision is made as to whether or not the details are found.

If the answer is "NO" an attempt is made to match the incoming number with a client at step S64. If the answer to step S64 is "NO" step S65 goes to already described step S55 so as to repeat steps S56, S57 and S60. If the answer to step S64 is "YES" the flow proceeds to already described step S61.

If the answer at step S63 is "YES" the call is answered at step S66 and at step S67 an options menu is played to the caller. If the caller responds appropriately at step S68 and an option entered the procedure loops with step S69 until the selections of options is terminated with a "NO" response from step S68 where the system hangs up at step S70.

Returning now to the main path of the flow diagram a decision is made at step S71 as to whether or not the DNIS has been matched to the carer's details on the database. If the answer to this step is "YES" then the next step, S72, corresponds to step S16 of FIG. 4. If the details are not found and the answer to step S71 is "NO", then the call is answered again within the normal number of rings which would be expected by the caller. This occurs at step S73 and the system goes into a loop similar to steps S57, S58, S59 and S60 save that in this loop it is the carer's details which are requested at steps S74–S78. The requested information is then entered at step S71 as previously described.

Step S78 corresponds to step S15 of FIG. 4 and steps S80, 81 and 82 also correspond to steps S20–22 of FIG. 4. However the enhanced system being described also checks if there are any messages waiting for the carer. This is done at step S83. If the answer is "NO" steps s73, 74 and 85 correspond to steps S17–19 of FIG. 4. If the answer is "YES" two options are available. Either at step S87 the phone is taken off hook and the stored number is dialled as a network call at step S88. In this case the number of ringing tones is greater than the expected number so the carer is prompted to pick up the phone so that the waiting messages can be replayed to him/her at step S89 after which the call is terminated at step S90. Alternatively the call is answered within the short number of rings which is the system's normal response at step S91 whereupon after the messages have been relayed at step S89 the call is terminated as before.

Figure 9:
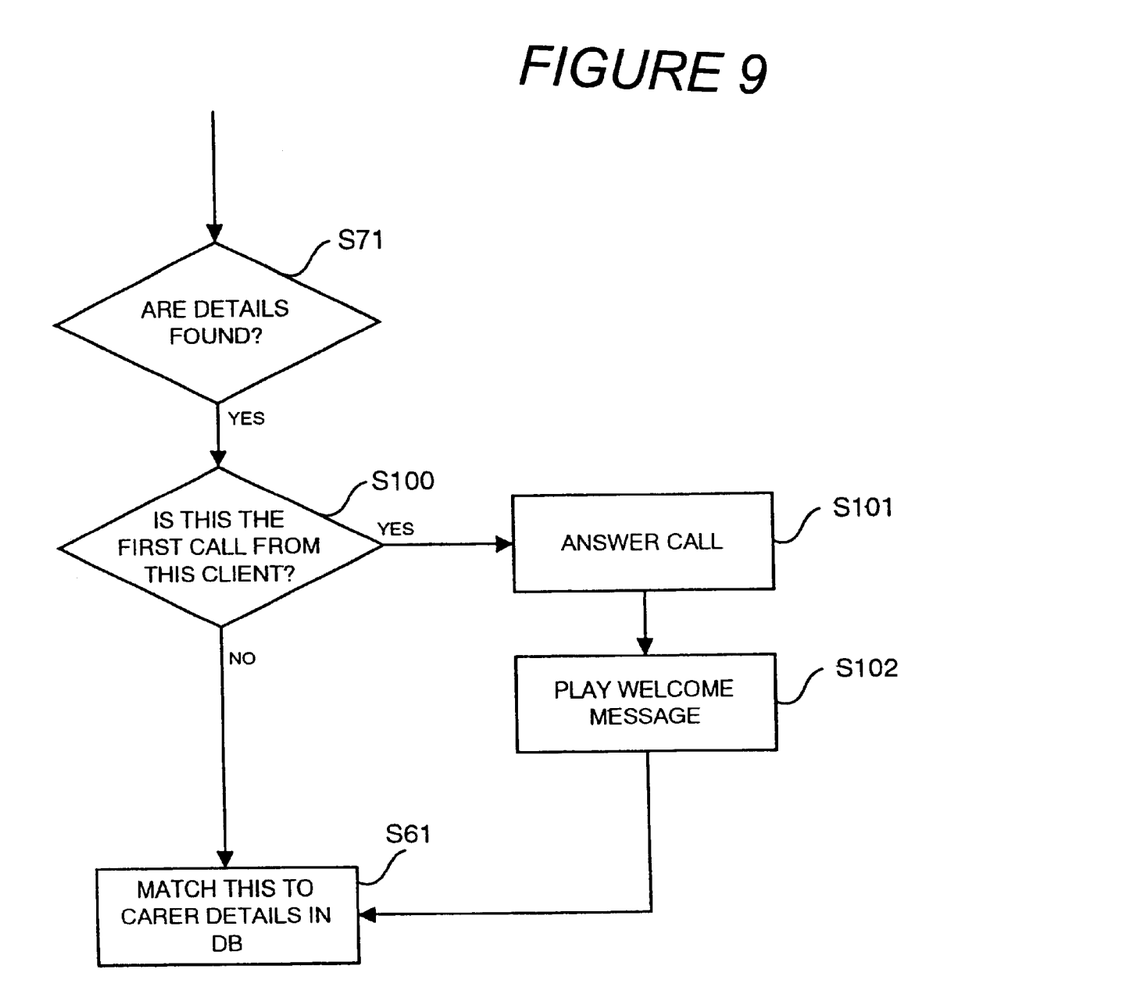
FIG. 9 is a flow diagram of an additional facility.

Turning now to FIG. 9, this shows a short sequence which can be added to the flow diagrams of FIGS. 4, 7, and 8 and illustrates the considerable versatility of the system. It is assumed that the sequence is added to flow from step S71 of FIG. 8A between step S71 and step S72. Thus at extra step S100 a decision is made as to whether or not this is the first call from a carer working for a particular client. If the decision is "YES", the call is answered at step S101, a welcome message played at step S102 and the original step S72 follows. If the answer is "NO" step S72 follows as usual.

It will be appreciated that a key component of the monitoring systems just described is the application software 14. This software suite can be located into an electronic processor via any suitable medium such as floppy disc shown at 8 in FIG. 1.

Further, the computer program can be obtained in electronic form for example by downloading the code over a network such as the internet.

Figure 10:
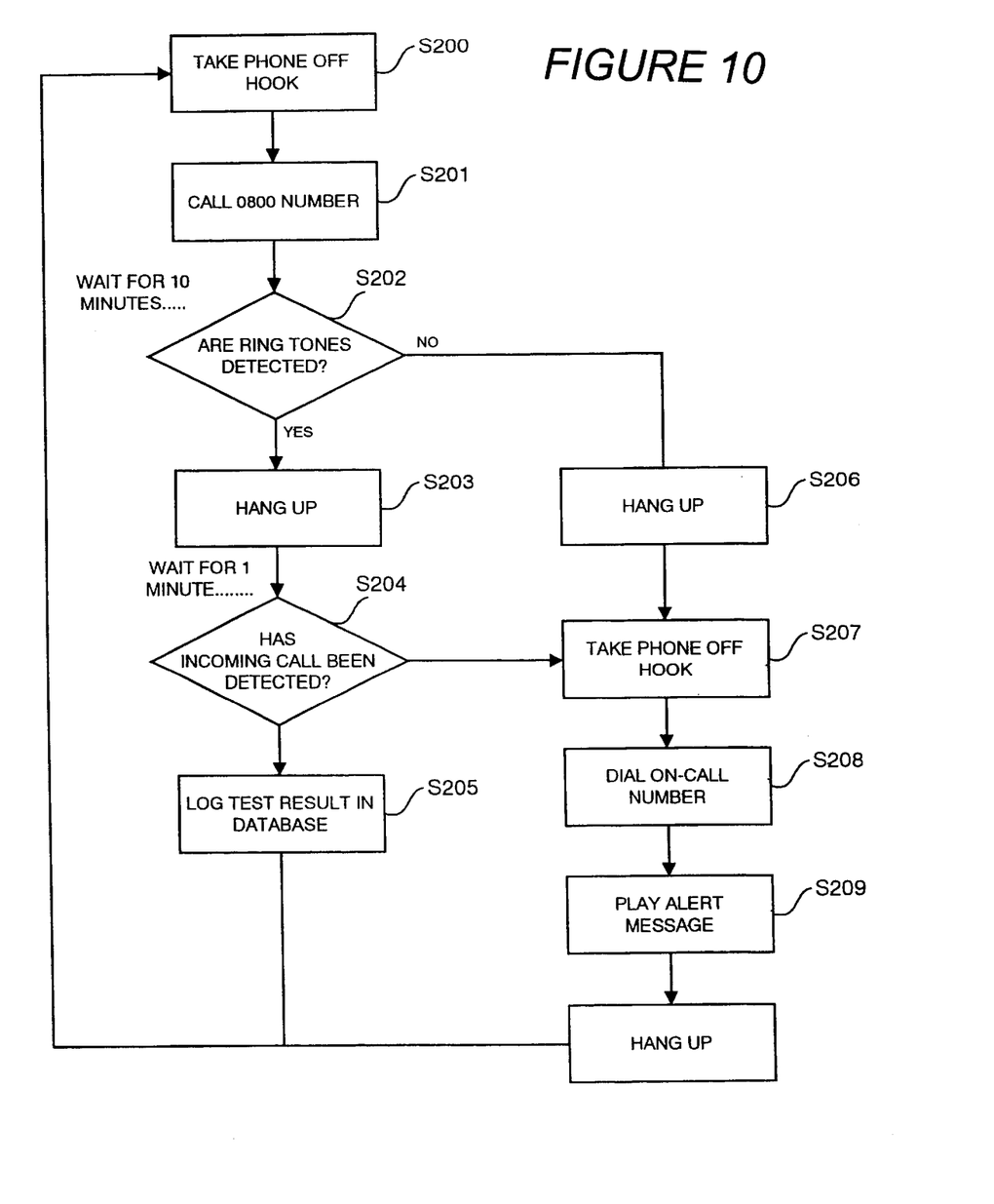
FIG. 10 is a flow diagram of an autocheck-up sequence.

One present embodiment also incorporates an auto-check ability and this is shown in the flow diagram of FIG. 10.

This facility utilises a separate telephone live and automatically calls the system of FIG. 5 at defined intervals, such as say 10 minutes. If thus mimics an actual caller. It also waits for a short period after the check-up call has been made, for example 1 minute, so as to determine whether or not the call was received.

If no ringing tones are detected or the ring back was not received the system is judged to be failing and an alarm call is made to a designated number. This facility can be sited away from the main monitoring system with dedicated PC hardware and telephone line. The system hardware is similar to that shown in FIG. 5. If more than one telephone line is being used by the main monitoring system the facility can be progammed to dial the different numbers either randomly or in sequence.

The operation of the auto-check facility is described in the flow diagram of FIG. 10. At step S200 the phone is taken off hook and the free-call number dialled at step S201. A decision is made at Step S202 whether or not ringing tones. If the answer is "YES" the next Step, S207 hangs up the phone and the facility waits for the return call. Step S209 is a decision step which decides whether or not a ring-back has been detected. If the answer is "YES" the flow chart loops back to Step S200 after logging the successful result in the database at Step S205. If the answer to Step S202 is "NO" Step S205 hangs up the phone at Step S206. Step S207 is common to both branches of the flow diagram as it deals with a fault on the monitoring system. In this step the phone is taken off-hook and at Step S208 a stored emergency number is dialled or a message transmitted in the modem and an alert message is sent. Finally Step S210 hangs up the phone at Step S209 again to repeat the procedure.

What is claimed is:

1. A monitoring system for monitoring incoming telephone calls routed through a call transference system, the system comprising an electronic processor and an associated database, the system being adapted to detect the originating number of the caller and the called number to which the incoming call was made before being transferred, to automatically generate a return call to any incoming call the originating and called numbers of which have been identified without answering the incoming call, and to store the time and date of an incoming call the number of which has been identified and data representing the number to which the incoming call was made.

2. A system according to claim 1, wherein the processor is adapted to compare the number of an incoming call with stored numbers so as to match the parameters of an incoming call with a stored data to determine the origins of the call from which the call was made, and to compare the time and date of a matched number with a visit schedule stored on said database representing the expected times and dates at which callers should visit predetermined sites.

3. A system according to claim 1 and adapted to compare the called number with a visit schedule of users stored in said data base so as to identify the caller.

4. A system according to claim 2 and adapted to compare the called number with a schedule of users stored in said data base so as to identify the caller.

5. A system according to claim 3, wherein said processor is adapted to generate data indicating matched numbers and indicating compliance or not of the times and dates of matched numbers with the visit schedule.

6. A system according to claim 4, wherein said processor is adapted to generate data indicating matched numbers and indicating compliance or not of the times and dates of matched numbers with the visit schedule.

7. A monitoring system from monitoring incoming telephone calls so as to generate data regarding the location and occurrence of the incoming calls; the system comprising an electronic processor connectable to a telephone line and adapted to respond to an incoming call to determine if the call has or has not Caller Line Identification (CLI) and if the original number dialled was a free call number to identify the free call number dialled so as to identify the identity and location of the incoming call; and to generate a return call in response to an incoming call without actually answering the call.

8. A system according to claim 7, wherein if the identity of the caller cannot be identified, the system is adapted to answer the call and request additional information.

9. A monitoring system for monitoring incoming telephone calls routed through a call transference system, the system comprising an electronic processor and an associated database, the system being adapted to detect the originating number of the caller and the called number to which the incoming call was made before being transferred, to automatically generate a return call to any incoming call the originating and called numbers of which have been identified without answering the incoming call, and to store the time and date of an incoming call the number of which has been identified and data representing the number to which the incoming call was made, or if a message is waiting for an identified caller to answer the call and replay the message.

10. A monitoring system from monitoring incoming telephone calls so as to generate data regarding the location and occurrence of the incoming calls; the system comprising an electronic processor connectable to a telephone line and adapted to respond to an incoming call to determine if the call has or has not Caller Line Identification (CLI), and if the original number dialled was a free call number to identify the free call number dialled so as to identify the identity and location of the incoming call; to generate a return call in response to an incoming call without actually answering the call, to hang up the return call after a predetermined number.

11. A monitoring system for monitoring incoming telephone calls routed through a call transference system, the system comprising an electronic processor and an associated database, the system being adapted to detect the originating number of the caller and the called number to which the incoming call was made before being transferred, to automatically generate a return call to any incoming call the originating and called numbers of which have been identified without answering the incoming call when the incoming has been terminated, to store the time and date of an incoming call the number of which has been identified and data representing the number to which the incoming call was made and adapted to count between the number of rings before the incoming call was terminated so as to identify the incoming call as signifying arrival or departure.

12. A monitoring system for monitoring incoming telephone calls routed through a call transference system, the system comprising an electronic processor and an associated database, the system being adapted to detect the originating number of the caller and the called number to which the incoming call was made before being transferred, to automatically generate a return call of a limited predetermined number of rings to any incoming call the originating and called numbers of which have been identified without answering the incoming call after the incoming call has been hung-up before being answered, and to store the time and date of an incoming call the number of which has been identified and data representing the number to which the incoming call was made, and additionally including the feature of continually ringing the return call if there is a message waiting for the incoming caller.

* * * * *